Feb. 27, 1945.   H. A. BERLINER   2,370,135
VARIABLE PITCH PROPELLER
Filed Sept. 25, 1941   3 Sheets-Sheet 1

Inventor
Henry A. Berliner
By Samuel Scrivener Jr.
Attorney

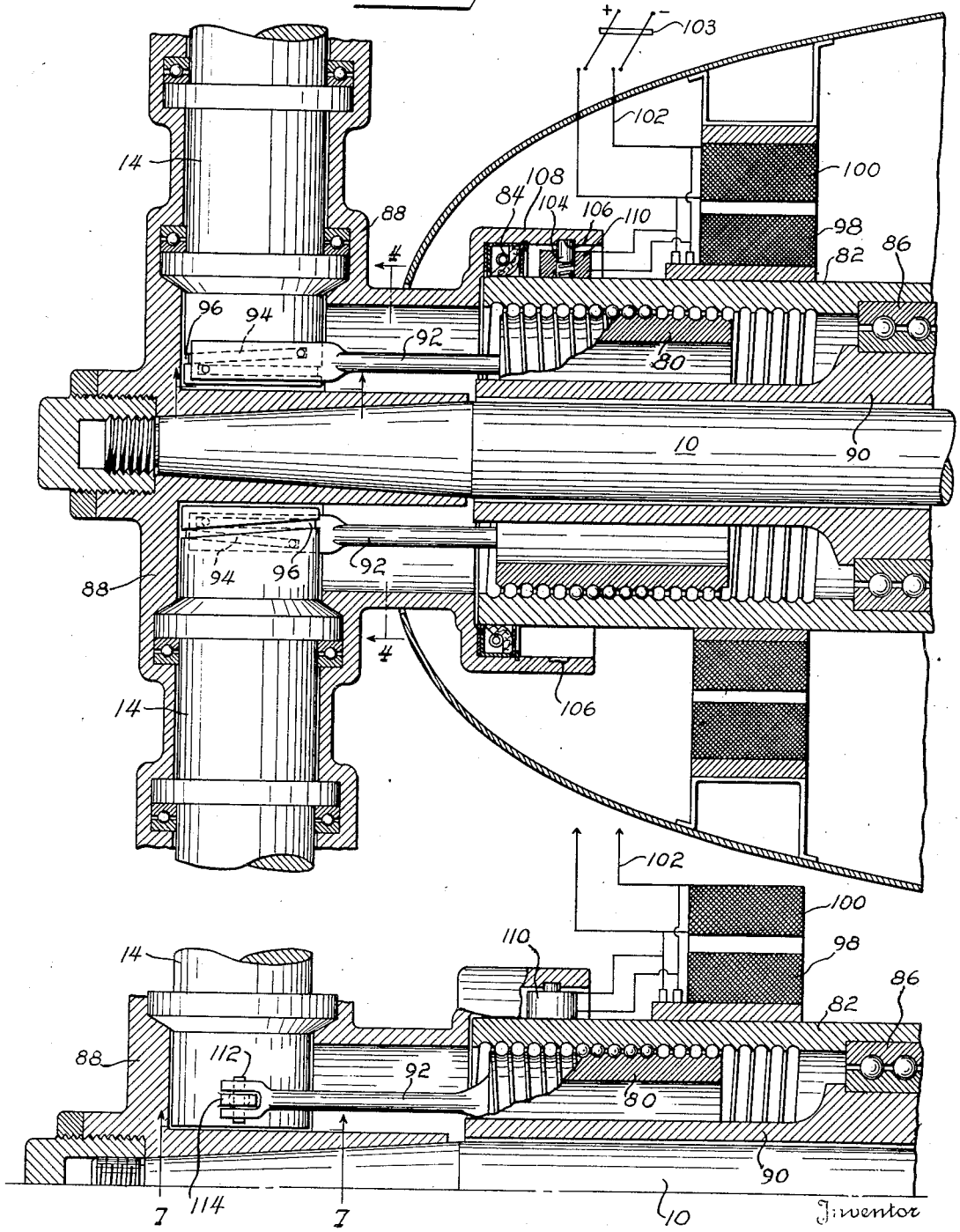

Feb. 27, 1945. H. A. BERLINER 2,370,135
VARIABLE PITCH PROPELLER
Filed Sept. 25, 1941   3 Sheets-Sheet 3
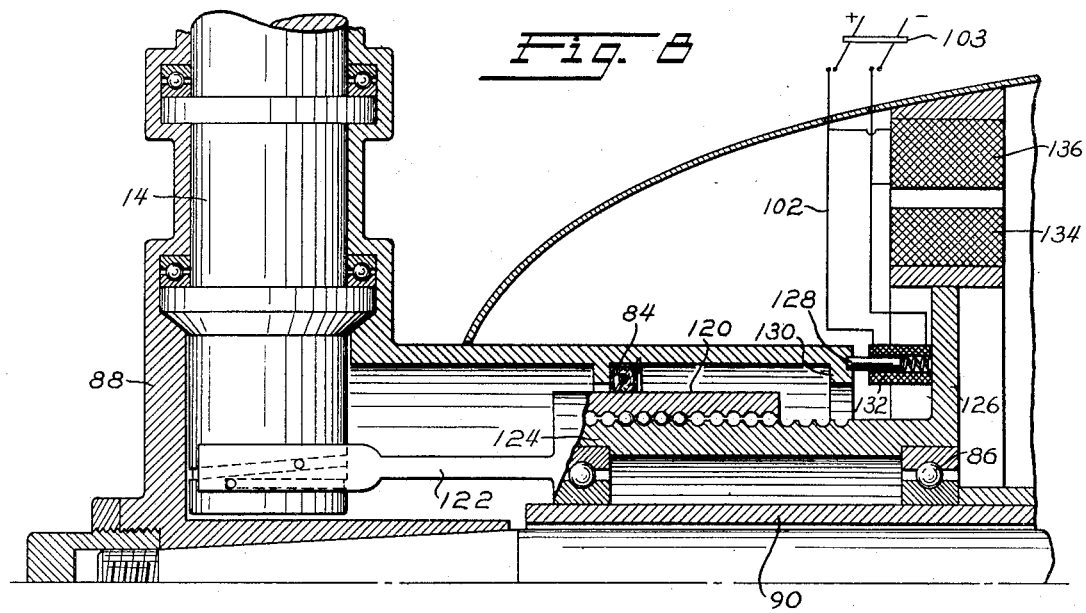
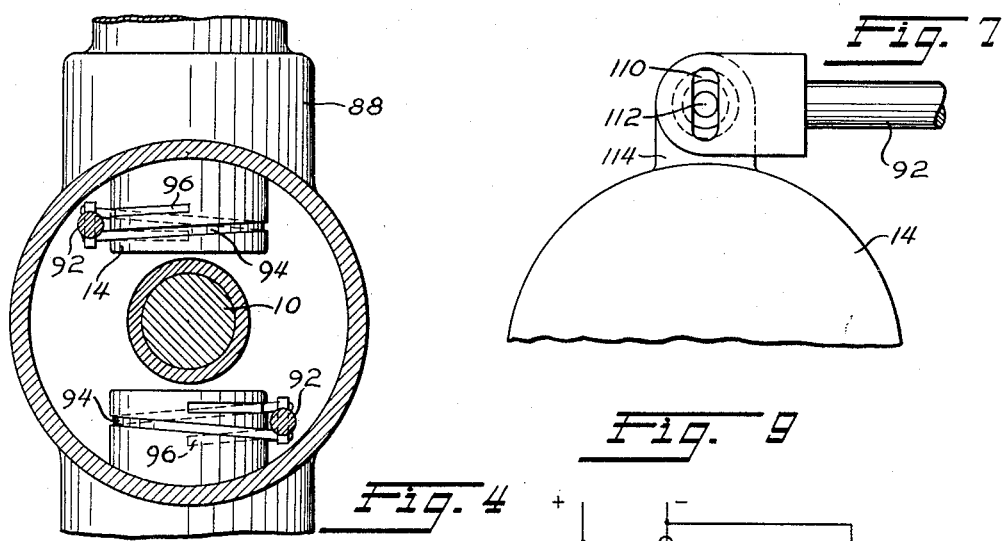
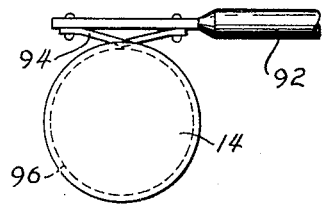
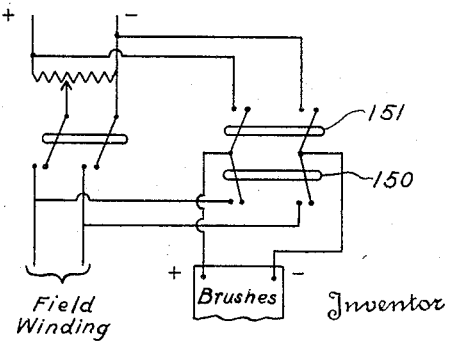
Inventor
Henry A. Berliner
By Samuel Scrivener Jr.
Attorney Patented Feb. 27, 1945

2,370,135

UNITED STATES PATENT OFFICE 2,370,135

VARIABLE PITCH PROPELLER

Henry A. Berliner, Washington, D. C., assignor to Engineering and Research Corporation, Riverdale, Md., a corporation of Maryland Application September 25, 1941, Serial No. 412,322

1 Claim. (Cl. 170—163)

This invention relates to propellers and, more particularly, to propellers for aircraft or the like in which the pitch of the blades may be adjusted during operation.

A principal object of the invention is to provide pitch-changing means comprising an electric machine, one part of which is fixed against rotation and the other part of which is rotatably mounted with respect to the hub, the pitch-changing operation being effected by variation of the speed of rotation of this latter part with respect to the speed of rotation of the hub.

Another object of the invention is to provide propeller pitch-changing means in which the rotor of an electrical machine is operated at speeds above or below the speed of rotation of the propeller shaft to thereby produce a differential of speeds which is utilized to effect the variation of pitch.

Another object is to provide pitch-changing means in which the differential between the speeds of the propeller shaft and the rotor of an electrical machine is utilized to produce relative movement of two parts which are threadedly connected, such relative movement being utilized to produce the change in pitch.

Another object is to provide pitch-changing means in which controlled variations in the speed of rotation of one element of an electrical machine are utilized to effect variation of pitch, by reason of which simple operation no slip-rings are required.

Another of the objects of the invention is to provide a propeller in which a member movable axially of the hub is connected to the blades so as to turn them about their axes during axial movement of the member. Preferably, this member comprises one of a pair of members screw-threaded together which are normally rotatable with the hub and one of which is adapted to be turned relative to the other to effect a movement of the one which is connected to the blades.

Another object of the invention is to provide a propeller having means for varying the pitch of the blades in which the pitch changing means is normally braked to prevent operation thereof, the braking means being released when the pitch changing mechanism is made operative. According to the preferred construction, the mechanism for changing the pitch of the blades is electrically controlled and the braking means is released electrically upon each energization of the control mechanism.

The above and other objects, advantages and novel features of the invention will be apparent from the following description and the annexed drawings which, it will be understood, are only illustrative of the invention and impose no limitation thereon not specifically imposed by the appended claim.

Referring to the drawings, in which the same reference numerals refer to corresponding parts:

Fig. 3 is a view similar to Fig. 1 and showing a second embodiment of the invention;

Fig. 4 is a view taken on the line 4—4 of Fig. 3;

Fig. 5 is a view taken on the line 5—5 of Fig. 3;

Fig. 6 is a view similar to Fig. 3 and showing a modification of the invention;

Fig. 7 is a view taken on the line 7—7 of Fig. 6;

Fig. 8 is a view similar to Fig. 3 and showing a further modification of the invention, and Fig. 9 is a diagrammatic sketch showing a switch arrangement permitting the pitch-controlling motor to be used as a generator.

Figure 1:
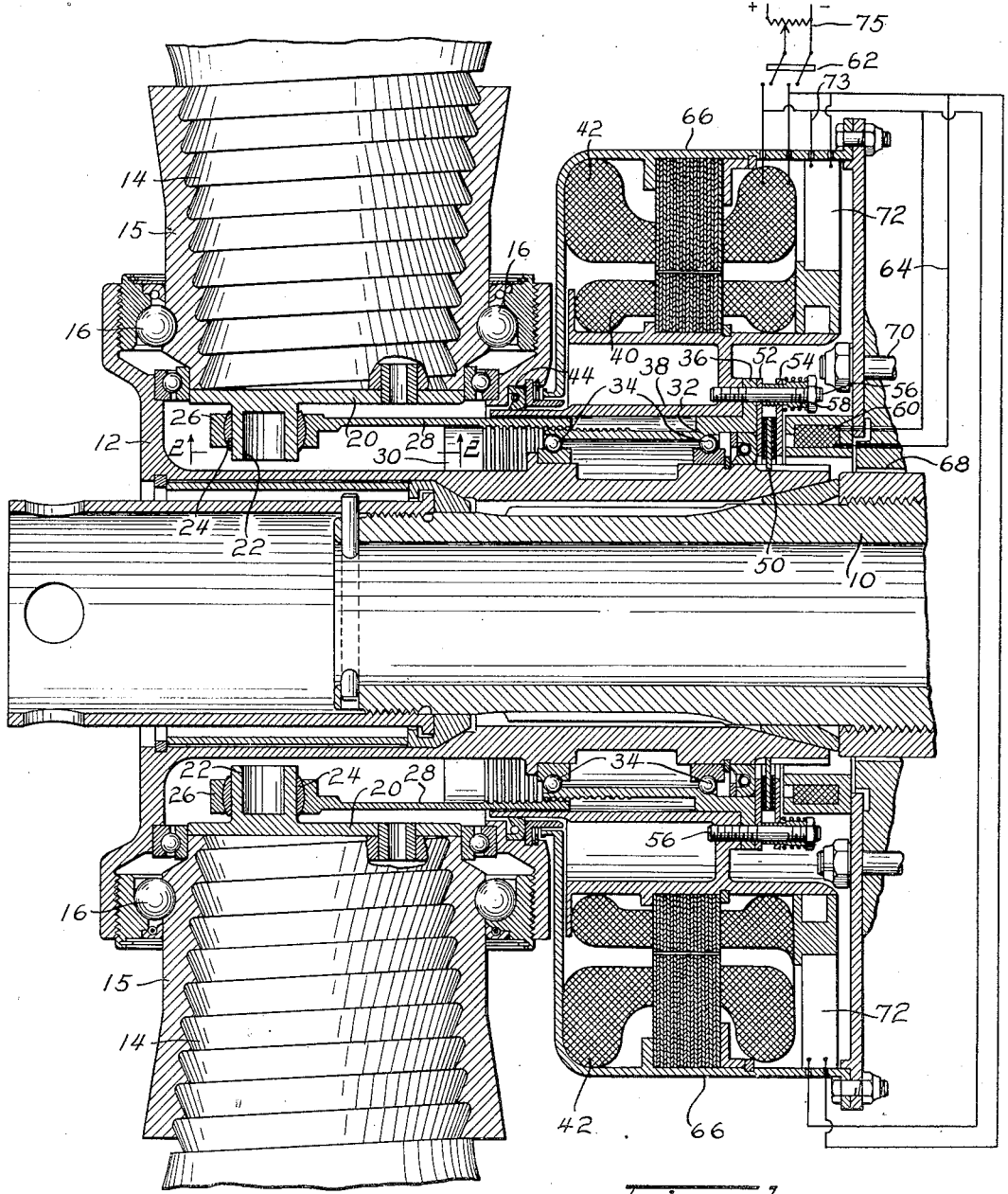
Fig. 1 is an axial sectional view of a pitch changing mechanism according to the invention.
Figure 2:
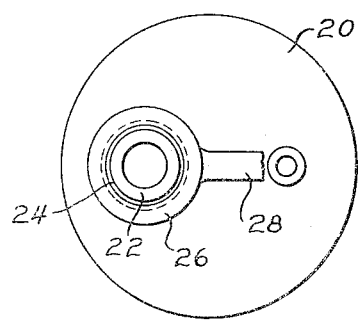
Fig. 2 is a view taken on the line 2—2 of Fig. 1.

The propeller mechanism disclosed in the drawings comprises a propeller shaft 10 which may be the crankshaft of an engine or a suitable extension thereof, on which a hub 12 is rigidly mounted. Blades 14 are mounted in radially extending sockets 15 which are mounted in the hub on ball bearings 16 which permit adjusting turning movement of the sockets and blades therein about the axes thereof.

Means are provided by the invention for turning the blades and sockets about their axes. Such means, in the case of each socket and blade, comprises a plate 20 which is fixed to the root end of the blade and which carries an eccentric, outwardly-extending pin 22 upon which a ball member 24 is slidably mounted. The ball member is surrounded by a sleeve 26 shaped to slide thereon and carried by the end of an arm 28 which is formed integrally with, or connected to, an outer cylindrical sleeve 30 which is internally helically threaded or grooved to co-operate with an externally helically threaded or grooved sleeve 32, the two sleeves surrounding and being concentric with shaft 10. The inner sleeve 32 is rotatably mounted on the hub in bearings 34, which prevent axial movement of the sleeve on the hub, and is provided with a flange 36 by which it is connected to a bearing sleeve 38 and to the rotor or armature 40 of an electric machine having a stator 42, the rotor and stator members preferably surrounding and being concentric with the shaft 10. The bearing sleeve extends over the end of the outer sleeve 30 and is sealed against the hub at 44.

The inner sleeve 32 and the armature 40 which is connected thereto, are normally but releasably connected to the shaft 10 by means of a spring-operated clutch comprising a ring 50, which surrounds and is splined or otherwise connected to the shaft 10, and two ring members 52, 54 which are disposed on opposite sides of the braking ring 50. Ring member 52 is disposed between driving ring 50 and the flange 36 carried by sleeve 32, while ring 54 is disposed on the other side of ring 50, rings 50 and 54 being movable toward and away from ring 52 and rings 52 and 54 being slidably received on a bolt 56 which also connects flange 36 to the rotor 40. A spring 58 is disposed between the head of the bolt and the clutch ring 54 and constantly urges the three rings into driving engagement with each other whereby the rotation of shaft 10 is imparted through the driving ring 50 and driven ring 52 to sleeve 32 and the rotor or armature 40. A winding 60 is disposed adjacent the clutch assembly and, when energized, moves rings 50 and 54 away from ring 52 against the force of spring 58, thereby releasing the sleeve 32 and the rotor 40 from driven engagement with the shaft.

Means are provided by the invention for varying the speed of the rotor 40 with respect to the shaft. Such means comprise the stator member or winding or series of windings 42 which surrounds the rotor 40 and, with it, forms an electrical machine which may operate both as a motor and a generator, depending on the conditions of operation. The stator is adapted to be connected to a source of electric energy through a switch 62 which also controls the supply of energy to leads 64 and the winding of solenoid 60, whereby the solenoid is operated to disengage the clutch rings 50, 52, 54 whenever the stator winding is energized. Brushes 72 and leads 73 are provided to conduct electric energy to the rotor windings upon energization of the stator and the solenoid. The stator and rotor form a unitary assembly surrounding the shaft 10 and enclosed by a housing 66 which is connected to the forward end of the engine 68 by bolts 70.

In the operation of the described device, the switch 62 is normally in open position, causing de-energization of the stator, rotor and solenoid and thereby permitting the spring 58 to hold the clutch rings 50, 52, 54 in driving engagement. In this condition the propeller shaft 10 rotates the inner sleeve 32 through the driving rings and also rotates the outer co-operating sleeve 30 through the hub 12, pin 22 and rod 28. Under these conditions the two sleeves will be rotated at the same speed and no relative axial movement between them will take place. If it is desired to adjust the pitch of the propeller, the switch 62 will be operated to cause current to flow through the stator and rotor windings, this energy at the same time operating solenoid 60 to cause release of the driving connection between rings 50, 52, 54. If the current flow in the stator and rotor windings is sufficient the rotor speed will be increased above the speed of shaft 10, while if the current flow is sufficient only to cause the rotor to operate at a speed less than that of the propeller shaft 10 the rotor speed will be decreased below the speed of the shaft, it being noted that in either case the speed of the outer sleeve 28 will remain equal to that of the shaft. A speed differential between the two sleeves will therefore occur, causing axial movement of the outer sleeve toward or away from the propeller blade. This movement is transmitted to the blade through pin 22, which is eccentric of the blade, as a force turning the blade about its axis. The ball connection between the pin 22 and the rod 28 permits any necessary relative movement between the two parts due to movement of the rod about the axis of sleeve 30. A rheostat 75 may be provided to control the current passed through the windings 40, 42 in order to produce a desired rotor speed either greater or less than the speed of the propeller shaft and to thereby adjust the pitch of the blades in either direction about their axes. After satisfactory pitch adjustment the windings and the solenoid may be de-energized, thus permitting the spring 58 to return the rings 50, 52, 54 to driving engagement, whereby the sleeve 32 again resumes the speed of shaft 10 and sleeve 30.

It will be seen that no slip-rings will be required in the described apparatus, this feature being of particular advantage.

In the embodiment of the invention disclosed in Figs. 3, 4 and 5 the blades are adapted to be turned about their axes to change the pitch thereof by a mechanism carried by and normally rotatable with the hub and shaft and comprising a pair of sleeves 80 and 82, formed with complementary helical grooves or threads on their outer and inner surfaces, respectively, the grooves or threads receiving bearing balls connecting the sleeves together for relative rotatable and axial movement. The outer sleeve 82 is supported on ball bearings 84 and 86, carried respectively by an extension of the hub 88 and by a sleeve 90 secured on the propeller shaft 10. The sleeve 80 requires no support other than that afforded by the sleeve 82, but may, if desired, be splined or otherwise mounted for axial movement on the sleeve 90. The blades are connected to the sleeve 80 to be turned, as the sleeve shifts axially, by means of rods 92 terminating in end portions having connected thereto flexible straps 94, tightly engaging grooves 96 in the root ends of the blades. With this construction, when the sleeve 80 and rods 92 are moved axially, the blades will be rotated about their own axes to vary the pitch thereof, and when the sleeve 80 is stationary the blades will be tightly held against such rotation.

The sleeve 82 is normally locked to the hub 88 to rotate at the same speed, by one or more spring-pressed plungers 104 which are slidably supported by the sleeve and adapted to engage in one of a plurality of recesses 106 in the inner periphery of an extension 108 of the hub. A coil 110 surrounds the plunger and is connected to the circuit of the winding 98 of an electric motor so that whenever that winding is energized, the coil will withdraw the plunger, thereby releasing the sleeve 82. The sleeve 82 may be rotated at any desired speed, greater or less than that of shaft 10, when the plungers 104 are released from recesses 106, by means of an electric motor comprising the rotor or armature 98, which surrounds and is attached to the sleeve 82, and a stator 100 which surrounds the rotor 98. The stator, rotor and solenoid windings are simultaneously energized or de-energized by means of a switch 103.

The operation of the apparatus of Fig. 3 will, it is believed, be apparent, being generally similar to that of the embodiment disclosed in Fig. 1. No further description of the operation will therefore be made.

The construction of Figs. 6 and 7 is substantially identical to that of Fig. 3, except that a different type of connection between the movable sleeve 80 and the blades is provided. As shown in these figures, the rods 92 terminate in yoked end portions having elongated slots 110 (Fig. 7) receiving the ends of pins 112. The pins are formed with partially spherical portions at their centers which are received in openings in lugs 114, secured rigidly to and extending laterally from the root ends of the propeller blades. This construction permits universal movement of the rods 92 with respect to the blade roots and also permits a substantial longitudinal movement of the rods in turning the blades.

It will be apparent that in any embodiment of the invention either the inner or the outer sleeve may be connected to the blades. An embodiment in which the outer sleeve is connected to the blades is disclosed in Fig. 8. In this construction the sleeve 120, which is connected to the blades by rods 122, is mounted externally of the sleeve 124, which terminates at its inner end in a substantially radial flange 126. The plunger 128 is mounted to move axially into engagement with openings in the face of a flange 130 which is carried by the hub, and such plunger is controlled by the coil 132 in the same manner as in the embodiment disclosed in Figs. 3 and 6. The motor armature 134 is carried by the flange 126 and cooperates with the fixed field winding 136 in the same manner and to produce the same mode of operation as in the other embodiments of the invention.

The pitch-varying motor of any of the embodiments of the invention may be used as a generator, whenever desired, by merely energizing the field windings and connecting the armature windings to deliver energy to charge the battery. A circuit including switches for effecting such a change in the armature connections is disclosed in Fig. 9, in which switch 150 controls the connection of the brushes to the source of energy and is adapted to be closed when the electrical machine is to be operated as a motor in order to effect a pitch variation. Switch 151 is adapted to be closed, when switch 150 is opened, in order to deliver energy generated in the rotating armature windings from the brushes to charge the battery.

Means for indicating the pitch of the propeller may be incorporated in any embodiment of the invention and may preferably be of the type disclosed and claimed in the co-pending application of Thomas Barish and Vaino Hoover, Serial No. 427,052, filed Janaury 16, 1942.

While several embodiments of the invention have been shown and described in detail, it will be understood that numerous changes might be made therein or that other embodiments of the invention might be devised. It is, therefore, not intended to limit the scope of the invention to the embodiments shown, nor otherwise than by the limitations of the appended claim.

What is claimed is:

A variable pitch propeller having a hub, and a plurality of blades carried thereby, means for rotating the hub, means for varying the angularity of the blades during rotation of the hub comprising two parts screw-threaded together, one of said parts being connected to the blades to be rotated therewith and being so connected to the blades that movement thereof toward or away from the blades causes rotation of the blades about their axes, a motor having a rotor, the other of said screw-threaded parts being connected to said rotor, a clutch connecting said second screw-threaded part and said rotor to the hub, a stationary stator for the motor and means for simultaneously releasing said clutch and energizing said stator to thereby vary the speed of the second screw-threaded part with respect to the hub and the first screw-threaded part.

HENRY A. BERLINER.